(12) United States Patent
Filippo et al.

(10) Patent No.: US 7,266,673 B2
(45) Date of Patent: Sep. 4, 2007

(54) SPECULATION POINTERS TO IDENTIFY DATA-SPECULATIVE OPERATIONS IN MICROPROCESSOR

(75) Inventors: Michael A. Filippo, Manchaca, TX (US); James K. Pickett, Austin, TX (US); Benjamin T. Sander, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 606 days.

(21) Appl. No.: 10/429,159

(22) Filed: May 2, 2003

(65) Prior Publication Data
US 2004/0221140 A1    Nov. 4, 2004

(51) Int. Cl.
  *G06F 9/30*    (2006.01)
(52) U.S. Cl. ...................... 712/218; 712/216
(58) Field of Classification Search ............... 712/225, 712/218
  See application file for complete search history.

(56) References Cited

U.S. PATENT DOCUMENTS

| | | | |
|---|---|---|---|
| 5,781,752 A | | 7/1998 | Moshovos et al. |
| 5,903,741 A | * | 5/1999 | Witt et al. ............ 712/218 |
| 5,966,544 A | | 10/1999 | Sager |
| 6,212,626 B1 | | 4/2001 | Merchant et al. |
| 6,381,691 B1 | * | 4/2002 | Altman et al. ............ 712/236 |
| 6,665,792 B1 | * | 12/2003 | Merchant et al. ............ 712/219 |
| 6,704,841 B2 | | 3/2004 | Chandhry et al. |
| 6,718,839 B2 | | 4/2004 | Chandhry et al. |
| 6,735,688 B1 | | 5/2004 | Upton et al. |
| 6,877,086 B1 | | 4/2005 | Boggs et al. |
| 6,952,764 B2 | | 10/2005 | Sager et al. |
| 2004/0221139 A1 | | 11/2004 | Filippo et al. |

FOREIGN PATENT DOCUMENTS

| WO | 01/61480 | 8/2001 |
|---|---|---|
| WO | 02/42902 | 5/2002 |

OTHER PUBLICATIONS

"Cyclone: A Broadcase-Free Dynamic Instruction Scheduler with Selective Replay," Ernst, et al., ACM SIGARCH Computer Architecture News, vol. 31, Issue 2, May 2003, 10 pages.
"Speculation Techniques for Improving Load Related Instruction Scheduling," 26th Annual International Symposium on Computer Architecture, 1999, 12 pages.
International Search Report and Written Opinion, PCT/US2004/000483, mailed Aug. 19, 2005, 13 pages.

* cited by examiner

*Primary Examiner*—Donald Sparks
*Assistant Examiner*—Benjamin P. Geib
(74) *Attorney, Agent, or Firm*—Robert C. Kowert; Meyertons, Hood, Kivlin, Kowert & Goetzel, P.c.

(57) ABSTRACT

A microprocessor may include a retire queue and one or more data speculation verification units. The data speculation verification units are each configured to verify data speculation performed on operations. Each data speculation verification unit generates a respective speculation pointer identifying outstanding operations on which data speculation has been verified by that data speculation verification unit. The retire queue is configured to selectively retire operations dependent on the speculation pointer received from each of the data speculation verification units.

35 Claims, 4 Drawing Sheets

SPECULATION POINTERS TO IDENTIFY DATA-SPECULATIVE OPERATIONS IN MICROPROCESSOR

BACKGROUND OF THE INVENTION

1. Field of the Invention

This invention is related to the field of microprocessors and, more particularly, to performing data speculation in a microprocessor.

2. Description of the Related Art

Superscalar microprocessors achieve high performance by executing multiple instructions concurrently and by using the shortest possible clock cycle consistent with their design. However, data and control flow dependencies between instructions may limit how many instructions may be issued at any given time. As a result, some microprocessors support speculative execution in order to achieve additional performance gains.

One type of speculation is control flow speculation. Control flow speculation predicts the direction in which program control will proceed. For example, branch prediction may be used to predict whether a branch will be taken. Many types of branch prediction are available, ranging from methods that simply make the same prediction each time to those that maintain sophisticated histories of the previous branches in the program in order to make a history-based prediction. Branch prediction may be facilitated through hardware optimizations, compiler optimizations, or both. Based on the prediction provided by the branch prediction mechanism, instructions may be speculatively fetched and executed. When the branch instruction is finally evaluated, the branch prediction can be verified. If the prediction was incorrect, any instructions that were speculatively executed based on the incorrect predication may be quashed.

Another type of speculation is data speculation, which predicts data values. Proposed types of data speculation include speculatively generating addresses for memory operations and speculatively generating data values for use in computational operations. As with control speculation, the underlying conditions used to speculative generate a value are eventually evaluated, allowing the speculation to be verified or undone.

SUMMARY

Various embodiments of methods and systems for retiring operations dependent on speculation pointers identifying which operations are data speculative with respect to various verification units within a microprocessor are disclosed. In one embodiment, a microprocessor may include a retire queue and one or more data speculation verification units. The data speculation verification units are each configured to verify data speculation performed on operations. Each data speculation verification unit generates a respective speculation pointer identifying outstanding operations on which data speculation has been verified by that data speculation verification unit. The retire queue is configured to selectively retire operations dependent on the speculation pointer received from each of the data speculation verification units.

In one embodiment, one of the data speculation verification units may be included in a load store unit. Such a data speculation verification unit may be configured to verify types of data prediction such as dependency prediction, address prediction, and/or data prediction. For example, a data speculation verification unit included in a load store unit may be configured to verify a dependency prediction predicting that a younger load operation is not dependent on an older store operation with an uncomputed address. Similarly, a data speculation verification unit included in a load store unit may be configured to verify a dependency prediction predicting that a result of a younger load operation will equal a source of an older store operation.

Another one of data speculation verification units may be included in a functional unit configured to execute non-memory operations. Such a data speculation verification unit may be configured to verify a data prediction predicting the result of a non-memory operation. Yet another data speculation verification unit may be included in a memory controller and configured to verify memory predictions.

In one embodiment, one of the data speculation verification units may be configured to receive information identifying each outstanding operation for which a type of data speculation verified by that data speculation verification unit has been performed. That data speculation verification unit may be configured to identify which outstanding operations have been verified by that data speculation verification unit by advancing its respective speculation pointer to identify an operation that is younger than the youngest outstanding operation on which that type of data speculation has been verified and older than another outstanding operation on which that type of data speculation has been performed. If no operation is currently identified to that data speculation verification units as being data-speculative, that data speculation verification units may set a value of its respective speculation pointer to indicate that no currently outstanding operations are data-speculative with respect to that data speculation verification unit.

In embodiments in which the retire queue receives several speculation pointers, the retire queue may be configured to determine whether an operation is retirable by determining whether the operation is older than a youngest operation identified as being non-data-speculative by all of the speculation pointers.

A microprocessor that includes one or more data speculation verification units that generate speculation pointers and a retire queue that retires operations dependent on the speculation pointers may be included in a computer system.

In some embodiments, a method may involve: performing data speculation for an operation; a verification unit verifying the data speculation performed for the operation; the verification unit generating a speculation pointer indicating that the operation is not data-speculative with respect to the verification unit in response to said verifying; and, in response to the speculation pointer indicating that the operation is not data-speculative with respect to the verification unit, retiring the operation.

Such a method may also involve one or more other verification units verifying data speculation performed on other operations and generating other speculation pointers indicating that the other operations are not data-speculative with respect to those verification units. Retiring the operation may be dependent on all of the speculation pointers. Each verification unit may verify different types of data speculation.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Figure 1:
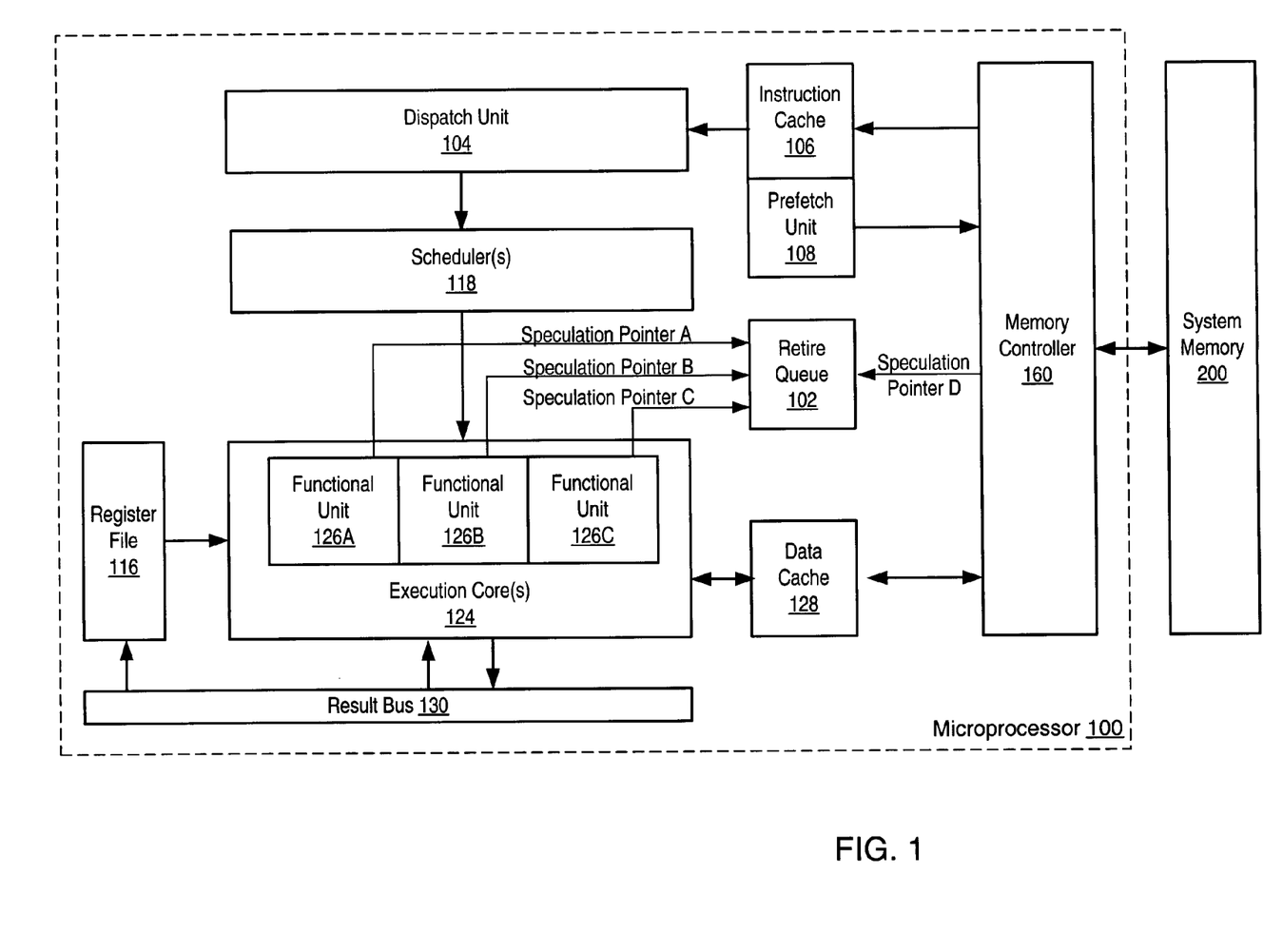
FIG. 1 shows a microprocessor, according to one embodiment.

FIG. 1 is a block diagram of one embodiment of a microprocessor 100. Microprocessor 100 is configured to execute instructions stored in a system memory 200. Many of these instructions operate on data stored in system memory 200. Note that system memory 200 may be physically distributed throughout a computer system and may be accessed by one or more microprocessors 100.

Microprocessor 100 may include an instruction cache 106 and a data cache 128. Microprocessor 100 may include a prefetch unit 108 coupled to the instruction cache 106. A dispatch unit 104 may be configured to receive instructions from instruction cache 106 and to dispatch operations to scheduler(s) 118. One or more schedulers 118 may be coupled to receive dispatched operations from dispatch unit 104 and to issue operations to one or more execution cores 124. Execution core(s) 124 may each include a load/store unit configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue 102 may be configured to determine when each issued operation may be retired. In one embodiment, the microprocessor 100 may be designed to be compatible with the x86 architecture. Note that microprocessor 100 may also include many other components. For example, microprocessor 100 may include a branch prediction unit (not shown).

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped). In some embodiments, there may be multiple levels of instruction and/or data cache 106 and 128. Some levels may be integrated with the microprocessor 100, as shown, while other levels of cache may be external to the microprocessor.

Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms.

Dispatch unit 104 may output signals including bit-encoded operations executable by the execution core(s) 124 as well as operand address information, immediate data, and/or displacement data. In some embodiments, dispatch unit 104 may include decoding circuitry (not shown) for decoding certain instructions into operations executable within execution core(s) 124. Simple instructions may correspond to a single operation. In some embodiments, more complex instructions may correspond to multiple operations. If an operation involves the update of a register, a register location within register file 116 may be reserved (e.g., upon decode of that operation) to store speculative register states (in an alternative embodiment, a reorder buffer may be used to store one or more speculative register states for each register). A register map may translate logical register names of source and destination operands to physical register names in order to facilitate register renaming. A register map may track which registers within register file 116 are currently allocated.

The microprocessor 100 of FIG. 1 supports out of order execution. A retire queue 102 may keep track of the original program sequence for register read and write operations, allow for speculative instruction execution and branch misprediction recovery, and facilitate precise exceptions. Retire queue 102 may be implemented in a first-in-first-out configuration in which operations move to the "bottom" of the buffer as they are validated, making room for new entries at the "top" of the queue. Retire queue 102 may retire an operation in response to that operation completing execution and any data or control speculation performed on any operations, up to and including that operation in program order, being verified. Retire queue 102 may commit the speculative state of a physical register to the architectural state of microprocessor 100 when the operation that generated the value in that physical register is retired. In some embodiments, retire queue 102 may be implemented as part of a reorder buffer. Such a reorder buffer may also provide data value storage for speculative register states in order to support register renaming. Note that in other embodiments, retire queue 102 may not provide any data value storage. Instead, as operations are retired, retire queue 102 may deallocate registers in register file 116 that are no longer needed to store speculative register states and provide signals to a register map indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

If a required operand of a particular operation is a register location, register address information may be routed to a register map (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that is determined to modify the contents of one of the logical registers. Therefore, at various points during execution of a particular program, register file 116 (or, in alternative embodiments, a reorder buffer) may have one or more registers that contain the speculatively executed contents of a given logical register.

A register map may assign a physical register to a particular logical register specified as a destination operand for an operation. Dispatch unit 104 may determine that register file 116 has one or more previously allocated physical registers assigned to a logical register specified as a source operand in a given operation. The register map may provide a tag for the physical register most recently assigned to that logical register. This tag may be used to access the operand's data value in the register file 116 or to receive the data value, via result forwarding on the result bus 130. If the operand corresponds to a memory location, the operand value may be provided on the result bus (for result forwarding and/or storage in register file 118) through load/store unit 222. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The bit-encoded operations and immediate data provided at the outputs of dispatch unit 104 may be routed to one or more schedulers 118. Note that as used herein, a scheduler is a device that detects when operations are ready for execution and issues ready operations to one or more functional units. For example, a reservation station is a scheduler. Operations in a scheduler or group of schedulers may also be referred to as operations in an instruction or operation window or scheduling window. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by functional units 126 (from register file 116 or result bus 130). In some embodiments, each scheduler 118 may be associated with a dedicated functional unit 126. In other embodiments, a single scheduler 118 may issue operations to more than one of the functional units 126.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 at least until those operations become non-speculative so that those operations may be reissued if the data speculation is incorrect.

In one embodiment, each of the execution core(s) 124 may include several functional units 126 (e.g., functional units 126A-126C, as shown in FIG. 1). Some functional units, e.g., 126A, may be configured to perform integer arithmetic operations of addition and subtraction, as well as shifts, rotates, logical operations, and branch operations. Other functional units, e.g., 126B, may be configured to accommodate floating point operations. One or more of the functional units, e.g., 126A, may be configured to perform address generation for load and store memory operations to be performed by a functional unit, e.g., 126C, that performs load and store operations to access data stored in data cache 128 and/or system memory. In one embodiment, such a functional unit 126C may be configured with a load/store buffer with several storage locations for data and address information for pending loads and/or stores.

One or more functional units 126 may also provide information regarding the execution of conditional branch instructions to a branch prediction unit so that if a branch was mispredicted, the branch prediction unit may flush instructions subsequent to the mispredicted branch that have entered the instruction processing pipeline and redirect prefetch unit 106. The redirected prefetch unit 106 may then begin fetching the correct set of instructions from instruction cache 106 or system memory 200. In such situations, the results of instructions in the original program sequence that occurred after the mispredicted branch instruction may be discarded, including those which were speculatively executed and temporarily stored in register file 116.

Results produced by functional units 126 within execution core(s) 124 may be output on the result bus 130 to the register file 116 if a register value is being updated. If the contents of a memory location are being changed, the results produced within execution core(s) 124 may be provided to the load/store unit 126C.

Data cache 128 is a cache memory provided to temporarily store data being transferred between execution core(s) 124 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

In some embodiments, a microprocessor 100 may include an integrated memory controller 160, allowing the microprocessor to interface directly to system memory 200. In other embodiments, memory controller 160 may be included in a bus bridge that indirectly couples microprocessor 100 to system memory 200.

Data Speculation

As described herein, a data value is speculative if there is a possibility that the data value may found to be incorrect and consequentially recomputed. A speculative data value is one that cannot be identified with certainty as being correct or incorrect. A data value may be recomputed if that data value is the result of an operation for which some data speculation has been performed or if the data value depends on another speculative data value (e.g., if the data value is generated as the result of an operation having one or more speculative operands).

Various mechanisms within a microprocessor 100 may perform data speculation. For example, dispatch unit 104, memory controller 160, and/or one or more functional units 126 may each perform data speculation for a particular operation. Dispatch unit 104 may detect that a result of one operation may be used as a speculative operand for another operation. For example, dispatch unit may predict that a load operation will access data stored to data cache 128 by a prior store operation. The dispatch unit 104 may responsively identify a data value stored in a register used as the source of the store operation as the speculative result of the load operation. This type of data speculation is referred to herein as dependency prediction. Dependency prediction may be extended in the dispatch unit 104 by linking the source of the store operation as a speculative operand source for operations specifying the result of the load operation as an operand. Another type of dependency prediction may be performed in load store unit 126C by allowing certain loads to bypass stores with uncomputed addresses, i.e., by predicting that younger loads are not dependent on earlier stores.

In a multiprocessor system, memory controller 160 may perform coherency checks to maintain cache coherency. Memory controller 160 may speculatively return a copy of a cache line from system memory 200 before coherency checks with other microprocessors' caches are complete. If the coherency checks subsequently determine that the correct copy of the cache line to retrieve is currently stored in another processor's cache, the copy of the cache line speculatively retrieved from system memory 200 may be invalidated. Accordingly, any load operation results generated from accessing that cache line will be speculative until the coherency checks finish. This type of speculation is referred to herein as memory prediction.

Dispatch unit 104 may perform data speculation by predicting the result of an operation. For example, some operations may tend to generate the same result, and thus each time one of those operations is handled, the result may be speculatively generated by dispatch unit 104 prior to actual execution of the operation by a functional unit 126. This type of data speculation is referred to herein as data prediction. Note that data prediction may also be performed in other portions of the microprocessor (e.g., in a load store unit 126C).

A load store unit 126C may speculatively generate the address and, based on the speculative address, the result of a load instruction whose address has not yet been computed based on a pattern of earlier-handled loads. For example, if the previous N load operations have targeted addresses A1-AN that are spaced by a constant offset C from each other (e.g., A1; A2=A1+C; . . . ; AN=A(N−1)+C), the load store unit 126C may speculatively return the data at the most recently accessed address AN plus the constant offset C as the result of the load operation. This type of data speculation is referred to herein as address prediction. Note that other forms of address prediction may be employed in other embodiments.

Operations that depend on the result of operations on which data speculation has been performed may also generate speculative results. For example, if address prediction is used to generate the speculative result of a load operation, any dependent operations that execute using the load's speculative result as an operand may produce speculative results, which may in turn be used as operands by other dependent operations. Accordingly, if the underlying speculation in the load operation is determined to be incorrect, the dependent operations' results may also be incorrect, and thus the entire dependency chain of operations dependent on that load may need to be re-executed in order to produce correct results. On the other hand, if the underlying speculation is found to be correct, the dependent operations' results may be correct (assuming those results are not based on any other speculative values).

Many operations for which data speculation has been performed may be verified when those operations are executed by a functional unit. For example, the data prediction used to speculatively generate the result of an operation may be verified by the functional unit 126 that executes that operation by comparing the actual result of the operation with the speculative result. Such operations may not need to be re-executed if the data speculation is incorrect, since the correct result is already available. Other operations may be verified without being completely executed. For example, if a load with an uncomputed address forwarded its result from an earlier store (e.g., due to dependency or address prediction), the speculative result of the load may be verified when the load address is calculated. If the data speculation is incorrect, such an operation may need to be re-executed (at least partially) in order to generate the correct result.

Since operations for which data speculation has been performed and their dependent operations may need to be re-executed, retire queue 102 may be configured to only retire operations for which any underlying data speculation has resolved. As shown in FIG. 1, each means for verifying data speculation (in this embodiment, memory controller 160 and functional units 126) may be configured to provide the retire queue 102 with a speculation pointer indicating the operations for which data speculation has been verified. Each speculation pointer may identify the operations for which data speculation has been verified, with respect to a particular verification means, by having a value equal to the tag of the youngest operation verified by that verification means. The retire queue 102 may use the speculation pointers to identify which operations may be retired. The various components within microprocessor 100 that are configured to verify one or more types of data speculation are referred to herein as data speculation verification units.

Each speculation pointer may identify which point in the underlying instruction stream is non-speculative with respect to a particular portion of the microprocessor. For example, Speculation Pointer D, which is generated by memory controller 160, may identify the youngest non-speculative operation with respect to memory controller 160, which verifies memory predictions. In one embodiment, memory controller 160 may generate Speculation Pointer D to point to the most recently verified operation for which memory prediction has been performed. In another embodiment, memory controller 160 may generate Speculation Pointer D to point to the operation just before the oldest unverified operation for which memory prediction has been performed. In general, Speculation Pointer D indicates to the retire queue 102 which operations are no longer speculative from the perspective of memory controller 160.

Functional units 126A and 126B may respectively perform integer and floating point operations in one embodiment. Functional units 126A and 126B may each verify data prediction. Speculation Pointers A and B respectively identify which operations have been verified by functional units 126A and 126B in the embodiment illustrated in FIG. 1. Speculation Pointer C is generated by a functional unit 126C that performs load and store operations. Speculation Pointer C may identify which operations have been verified by load store unit 126C. Functional unit 126C may be configured to verify address, data, and/or dependency predictions.

As described above, the value of each speculation pointer depends on which operations have been verified by a respective data speculation verification unit. In some embodiments, the values of the speculation pointers generated by the verification portions of the microprocessor 100 may also depend on information identifying the operations on which data speculation has been performed. For example, in one embodiment, memory controller 160 may track each operation on which memory prediction has been performed. As memory controller 160 verifies each operation, memory controller 160 may advance Speculation Pointer D to identify that all operations up to the next youngest operation on which memory prediction was performed are non-data-speculative with respect to the memory controller 160. In one embodiment, memory controller 160 may identify those operations by advancing Speculation Pointer D to point to the next youngest speculative operation tracked by memory controller 160. Similarly, the mechanisms that perform other types of data speculation (e.g., dispatch unit 104 and/or the functional unit 126C that performs load and store operations) may also track the operations on which data speculation has been performed. In some embodiments, at least some of these data speculation mechanisms may provide this information to the data speculation verification unit(s) (e.g., load store unit 126C and/or one or more of the other functional units 126) that are configured to verify that type of data speculation. If there are currently no data-speculative operations to be verified by a particular one of the data speculation verification units, the speculation pointer generated by that verification unit may be set to a value that indicates that all outstanding operations are non-data-speculative with respect to that particular verification unit.

The retire queue 102 may identify which operations may be retired by comparing the portions of the operation stream identified by the speculation pointers. The oldest operation identified by all speculation pointers as non-speculative may be the oldest operation retirable by retire queue 102. For example, assume operations 0-10 (with operation 0 being the oldest operation in program order and 10 being the youngest operation in program order, where program order is the order of the instructions in the program being executed before any operations re-ordering or out-of-order processing has been performed within microprocessor 100) have been dispatched by dispatch unit 104. If Speculation Pointer A indicates that operations up to operation 6 are non-data-speculative, Speculation Pointer B indicates that operations up to operation 5 are non-data-speculative, Speculation Pointer C indicates that operations up to operation 3 are non-data-speculative, and Speculation Pointer D indicates that all outstanding operations are non-data-speculative (e.g., because no memory prediction has been performed for any of operations 0-10), retire queue 102 may identify the operations up to operation 3 as the set of operations that may be retired. Note that operation retirement may also depend on typical retirement constraints such as whether those operations have already been executed by a functional unit 126 and whether any control prediction affecting those operations has successfully resolved. For example, if a data-speculative operation is determined to be incorrect and needs to be re-executed, that operation may be identified as non-speculative by one or more speculation pointers but should not be retired until that operation has been re-executed. Information about which operations have and have not been executed, or re-executed if needed, may be provided to the retire queue 102 by scheduler 118 in some embodiments.

Figure 2A:
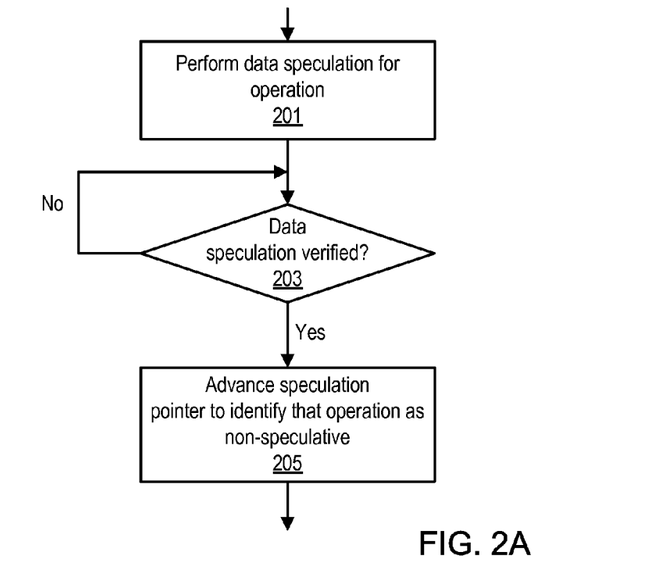
FIG. 2A is a flowchart illustrating how speculation pointers may be advanced, according to one embodiment.

FIG. 2A illustrates one embodiment of a method used to generate a speculation pointer. Such a method may be implemented, at least in part, by one of the data speculation verification units, such as memory controller 160 and functional units 126. At 201, data speculation is performed for an operation. The data speculation at 201 may be performed by the same portion of the microprocessor that will verify the data speculation in some embodiments. If that data speculation has been verified at 203, the speculation pointer may be advanced, as shown at 205, to identify the operation on which data speculation was performed at 201 as being non-speculative.

In one embodiment, advancing the speculation pointer at 205 may involve advancing the speculation pointer to identify the operation which has most recently been verified, indicating that all operations up to and including that operation are non-data-speculative with respect to a particular means for verifying data speculation. In other embodiments, advancing the speculation pointer at 205 may involve advancing the speculation pointer to identify the operation just before the next data-speculative operation, in program order, to be verified by that particular verification means. For example, a load store unit 126 may track which operations the load store unit has performed data speculation for. Each time that load store unit 126 verifies one of those data-speculative operations, the load store unit 126 may advance its speculation pointer to indicate that all operations up to the next operation for which the load store unit performed data speculation are non-data-speculative with respect to the load store unit. Other embodiments may advance the pointer in other ways. For example, a functional unit may verify a type of data speculation performed by the dispatch unit. In some embodiments, the functional unit may not be aware of the total set of outstanding operations on which the dispatch unit has performed that type of data speculation. Instead, the functional unit may only know which of the operations currently outstanding within that functional unit are data-speculative. Accordingly, in response to verifying data speculation for a particular operation, the functional unit may advance the speculation pointer to identify the operation just prior to the oldest data-speculative operation (if any) outstanding within that functional unit. If none of the operations currently outstanding within that functional unit are data-speculative, the functional unit may update the value of its speculation pointer to indicate that no outstanding operations are currently data-speculative with respect to that functional unit.

Figure 2B:
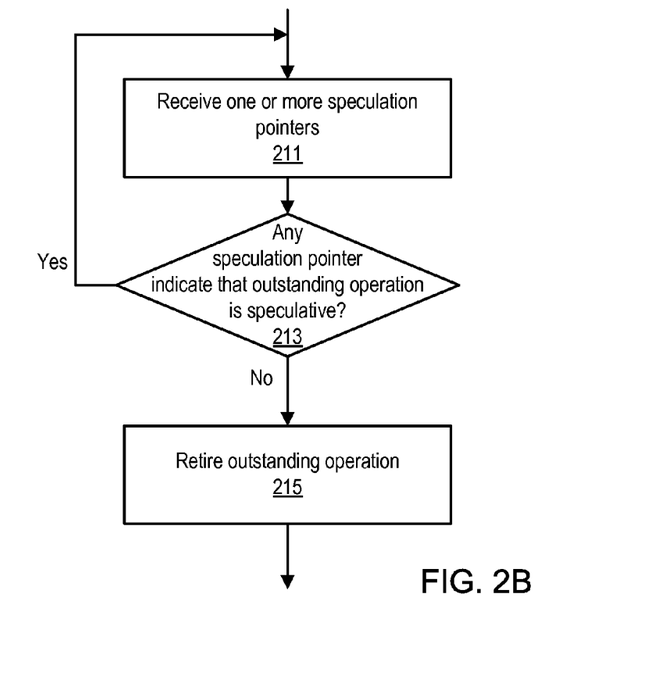
FIG. 2B is a flowchart illustrating a method of conditioning operation retirement on current speculation pointers, according to one embodiment.

FIG. 2B illustrates a flowchart of one embodiment of a method of retiring an outstanding operation. At 211, one or more speculation pointers are received. If multiple speculation pointers are received, each speculation pointer may identify a different portion of the outstanding operations as being non-data-speculative. If any of the speculation pointers indicates that a particular operation may still be data-speculative, that operation may not be retired, as indicated at 213. However, if none of the speculation pointers identify that operation as possibly being data-speculative, the operation may be retired, as indicated at 213-215, assuming all other prerequisites for retirement of that operation are met.

Exemplary Computer Systems

Figure 3:
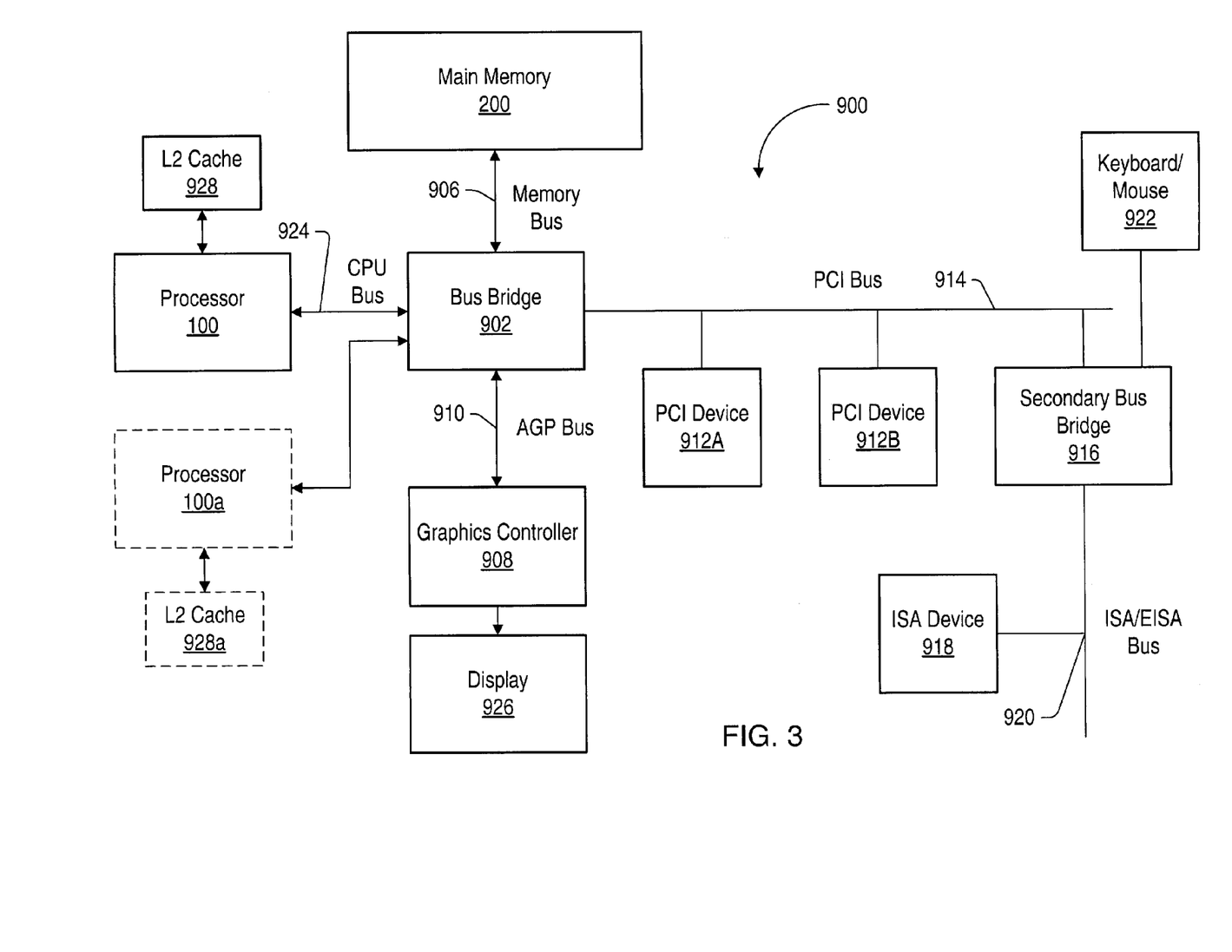
FIG. 3 shows an exemplary computer system, according to one embodiment.

FIG. 3 shows a block diagram of one embodiment of a computer system 900 that includes a processor 100 coupled to a variety of system components through a bus bridge 902. Processor 100 may include one or more data verification units configured to generate speculation pointers and a retire queue configured to retire operations identified by the speculation pointers as being non-data-speculative, as described above. Other embodiments of a computer system are possible and contemplated. In the depicted system, a main memory 200 is coupled to bus bridge 902 through a memory bus 906, and a graphics controller 908 is coupled to bus bridge 902 through an AGP bus 910. Several PCI devices 912A-912B are coupled to bus bridge 902 through a PCI bus 914. A secondary bus bridge 916 may also be provided to accommodate an electrical interface to one or more EISA or ISA devices 918 through an EISA/ISA bus 920. In this example, processor 10 is coupled to bus bridge 902 through a CPU bus 924 and to an optional L2 cache 928. In some embodiments, the processor 100 may include an integrated L1 cache (not shown).

Bus bridge 902 provides an interface between processor 100, main memory 200, graphics controller 908, and devices attached to PCI bus 914. When an operation is received from one of the devices connected to bus bridge 902, bus bridge 902 identifies the target of the operation (e.g., a particular device or, in the case of PCI bus 914, that the target is on PCI bus 914). Bus bridge 902 routes the operation to the targeted device. Bus bridge 902 generally translates an operation from the protocol used by the source device or bus to the protocol used by the target device or bus.

In addition to providing an interface to an ISA/EISA bus for PCI bus 914, secondary bus bridge 916 may incorporate additional functionality. An input/output controller (not shown), either external from or integrated with secondary bus bridge 916, may also be included within computer system 900 to provide operational support for a keyboard and mouse 922 and for various serial and parallel ports. An external cache unit (not shown) may also be coupled to CPU bus 924 between processor 100 and bus bridge 902 in other embodiments. Alternatively, the external cache may be coupled to bus bridge 902 and cache control logic for the external cache may be integrated into bus bridge 902. L2 cache 928 is shown in a backside configuration to processor 100. It is noted that L2 cache 928 may be separate from processor 100, integrated into a cartridge (e.g., slot 1 or slot A) with processor 100, or even integrated onto a semiconductor substrate with processor 100.

Main memory 200 is a memory in which application programs are stored and from which processor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 912A-912B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 918 is illustrative of various types of peripheral devices, such as a modem, a sound card, and a variety of data acquisition cards such as GPIB or field bus interface cards.

Graphics controller 908 is provided to control the rendering of text and images on a display 926. Graphics controller 908 may embody a typical graphics accelerator generally known in the art to render three-dimensional data structures that can be effectively shifted into and from main memory 200. Graphics controller 908 may therefore be a master of AGP bus 910 in that it can request and receive access to a target interface within bus bridge 902 to thereby obtain access to main memory 200. A dedicated graphics bus accommodates rapid retrieval of data from main memory 200. For certain operations, graphics controller 908 may further be configured to generate PCI protocol transactions on AGP bus 910. The AGP interface of bus bridge 902 may thus include functionality to support both AGP protocol transactions as well as PCI protocol target and initiator transactions. Display 926 is any electronic display upon which an image or text can be presented. A suitable display 926 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 900 may be a multiprocessing computer system including additional processors (e.g., processor 100a shown as an optional component of computer system 900). Processor 10a may be similar to processor 100. More particularly, processor 100a may be an identical copy of processor 100. Processor 100a may be connected to bus bridge 902 via an independent bus (as shown in FIG. 3) or may share CPU bus 924 with processor 100. Furthermore, processor 100a may be coupled to an optional L2 cache 928a similar to L2 cache 928.

Figure 4:
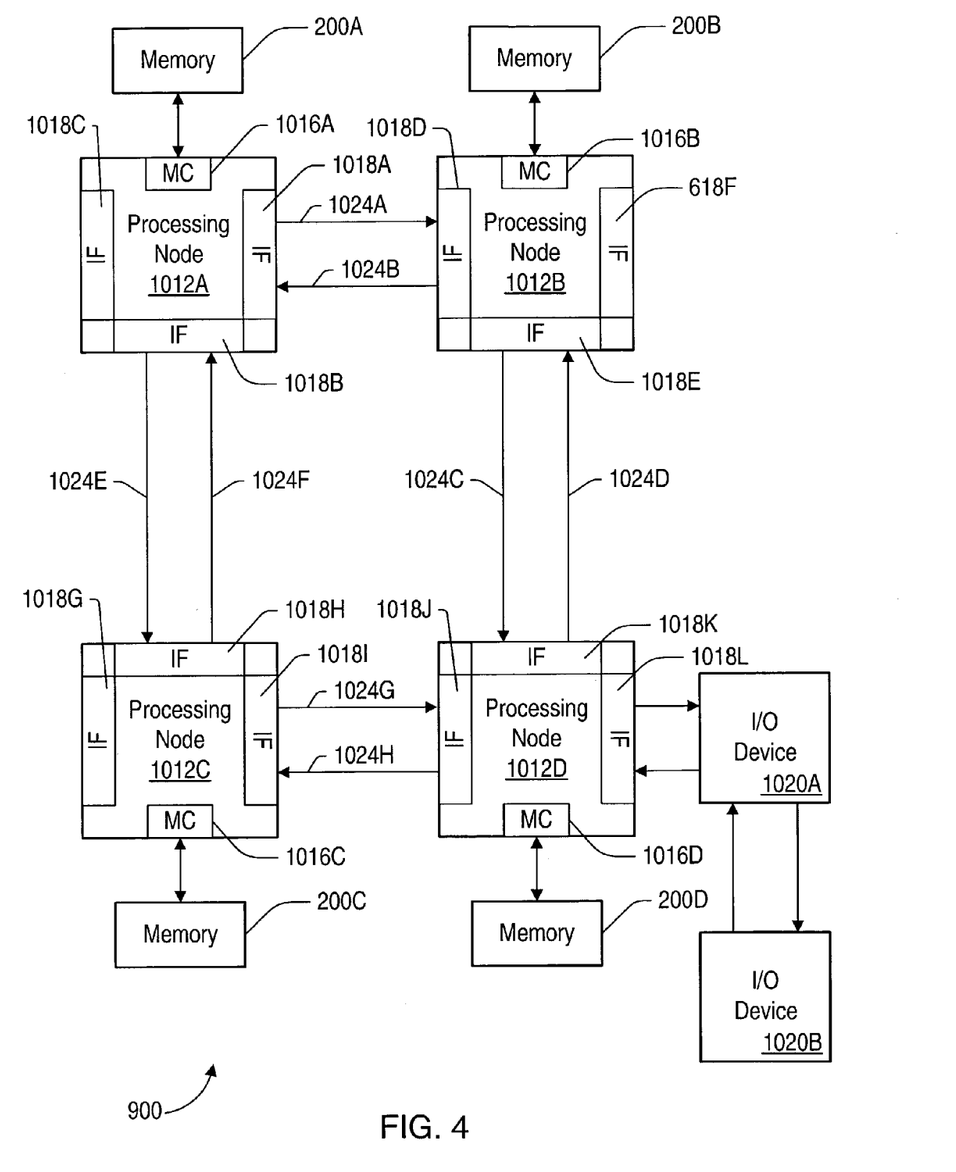
FIG. 4 shows another exemplary computer system, according to another embodiment.

Turning now to FIG. 4, another embodiment of a computer system 900 that may include a processor 100 having one or more data speculation verification units configured to generate speculation pointers and a retire queue that retires operations dependent on the speculation pointers as described above is shown. Other embodiments are possible and contemplated. In the embodiment of FIG. 4, computer system 900 includes several processing nodes 1012A, 1012B, 1012C, and 1012D. Each processing node is coupled to a respective memory 200A-200D via a memory controller 1016A-1016D included within each respective processing node 1012A-1012D. Additionally, processing nodes 1012A-1012D include interface logic used to communicate between the processing nodes 1012A-1012D. For example, processing node 1012A includes interface logic 1018A for communicating with processing node 1012B, interface logic 1018B for communicating with processing node 1012C, and a third interface logic 1018C for communicating with yet another processing node (not shown). Similarly, processing node 1012B includes interface logic 1018D, 1018E, and 1018F; processing node 1012C includes interface logic 1018G, 1018H, and 1018I; and processing node 1012D includes interface logic 1018J, 1018K, and 1018L. Processing node 1012D is coupled to communicate with a plurality of input/output devices (e.g., devices 1020A-1020B in a daisy chain configuration) via interface logic 1018L. Other processing nodes may communicate with other I/O devices in a similar fashion.

Processing nodes 1012A-1012D implement a packet-based link for inter-processing node communication. In the present embodiment, the link is implemented as sets of unidirectional lines (e.g., lines 1024A are used to transmit packets from processing node 1012A to processing node 1012B and lines 1024B are used to transmit packets from processing node 1012B to processing node 1012A). Other sets of lines 1024C-1024H are used to transmit packets between other processing nodes as illustrated in FIG. 4. Generally, each set of lines 1024 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 1012A to processing node 1012D may pass through either processing node 1012B or processing node 1012C as shown in FIG. 4. Any suitable routing algorithm may be used. Other embodiments of computer system 900 may include more or fewer processing nodes then the embodiment shown in FIG. 4.

Generally, the packets may be transmitted as one or more bit times on the lines 1024 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 1012A-1012D, in addition to a memory controller and interface logic, may include one or more processors. Broadly speaking, a processing node comprises at least one processor and may optionally include a memory controller for communicating with a memory and other logic as desired. More particularly, each processing node 1012A-1012D may include one or more copies of processor 100. External interface unit may include the interface logic 1018 within the node, as well as the memory controller 1016.

Memories 200A-200D may comprise any suitable memory devices. For example, a memory 200A-200D may comprise one or more RAMBUS DRAMs (RDRAMs), synchronous DRAMs (SDRAMs), static RAM, etc. The address space of computer system 900 is divided among memories 200A-200D. Each processing node 1012A-1012D may include a memory map used to determine which addresses are mapped to which memories 200A-200D, and hence to which processing node 1012A-1012D a memory request for a particular address should be routed. In one embodiment, the coherency point for an address within computer system 900 is the memory controller 1016A-1016D coupled to the memory storing bytes corresponding to the address. In other words, the memory controller 1016A-1016D is responsible for ensuring that each memory access to the corresponding memory 200A-200D occurs in a cache coherent fashion. Memory controllers 1016A-1016D may comprise control circuitry for interfacing to memories 200A-200D. Additionally, memory controllers 1016A-1016D may include request queues for queuing memory requests.

Interface logic 1018A-1018L may comprise a variety of buffers for receiving packets from the link and for buffering packets to be transmitted upon the link. Computer system 900 may employ any suitable flow control mechanism for transmitting packets. For example, in one embodiment, each interface logic 1018 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 1020A-1020B may be any suitable I/O devices. For example, I/O devices 1020A-1020B may include devices for communicate with another computer system to which the devices may be coupled (e.g., network interface cards or modems). Furthermore, I/O devices 1020A-1020B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

The above discussion describes signals as being "asserted". A signal may be defined as being asserted when it conveys a value indicative of a particular piece of information. A particular signal may be defined to be asserted when it conveys a binary one value or, alternatively, when it conveys a binary zero value.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
   one or more data speculation verification units configured to verify data speculation performed on operations and to generate a respective speculation pointer identifying outstanding operations on which data speculation has been verified by that one of the one or more data speculation verification units; and
   a retire queue coupled to receive a speculation pointer from each of the one or more data speculation verification units and configured to selectively retire operations dependent on the speculation pointer received from each of the one or more data speculation verification units, wherein the retire queue is configured to determine whether an operation is retirable by determining whether the operation is not younger than a youngest operation identified as being non-data-speculative by each of the speculation pointers received from the one or more data speculation verification units.

2. The microprocessor of claim 1, wherein a load store unit includes one of the one or more data speculation verification units, wherein the data speculation verification unit included in the load store unit is configured to verify dependency predictions.

3. The microprocessor of claim 2, wherein the data speculation verification unit included in the load store unit is configured to verify a dependency prediction predicting that a younger load operation is not dependent on an older store operation with an uncomputed address.

4. The microprocessor of claim 2, wherein the data speculation verification unit included in the load store unit is configured to verify a dependency prediction predicting that a result of a younger load operation will equal a source of an older store operation.

5. The microprocessor of claim 1, wherein a functional unit configured to execute non-memory operations includes one of the one or more data speculation verification units, wherein the data speculation verification unit included in the functional unit is configured to verify a data prediction predicting a result of a non-memory operation.

6. The microprocessor of claim 1, wherein the retire queue is included in a reorder buffer.

7. The microprocessor of claim 1, wherein one of the one or more data speculation verification units is configured to receive information identifying each one of a plurality of outstanding operations for which a type of data speculation verified by that one of the one or more data speculation verification units has been performed; and
   wherein that one of the one or more data speculation verification units is configured to identify which outstanding operations have been verified by that one of the one or more data speculation verification units by advancing a respective speculation pointer to identify an operation younger than the youngest outstanding operation on which data speculation has been verified and not younger than the oldest outstanding operation on which the type of data speculation has been performed.

8. The microprocessor of claim 1, wherein in response to the retire queue receiving a plurality of speculation pointers, the retire queue is configured to determine whether an operation is retirable by determining whether the operation is not younger than a youngest operation identified as being non-data-speculative by all of the plurality of speculation pointers.

9. The microprocessor of claim 1, wherein one of the one or more data speculation verification units is configured to set a value of a respective speculation pointer to indicate that no currently outstanding operations are data-speculative with respect to that one of the one or more speculation verification units if no operation currently outstanding within the one of the one or more data speculation verification units is data-speculative.

10. The microprocessor of claim 1, further comprising a memory controller, wherein one of the one or more data speculation verification units is comprised in the memory controller and configured to verify memory prediction.

11. A computer system, comprising:
a memory; and
a processor coupled to the memory, the processor comprising:
one or more data speculation verification units configured to verify data speculation performed on operations and to generate a respective speculation pointer identifying outstanding operations on which data speculation has been verified by that one of the one or more data speculation verification units; and
a retire queue coupled to receive a speculation pointer from each of the one or more data speculation verification units and configured to selectively retire operations dependent on the speculation pointer received from each of the one or more data speculation verification units, wherein the retire queue is configured to determine whether an operation is retirable by determining whether the operation is not younger than a youngest operation identified as being non-data-speculative by each of the speculation pointers received from the one or more data speculation verification units.

12. The computer system of claim 11, wherein a load store unit includes one of the one or more data speculation verification units, wherein the data speculation verification unit included in the load, store unit is configured to verify dependency predictions.

13. The computer system of claim 12, wherein the data speculation verification unit included in the load store unit is configured to verify a dependency prediction predicting that a younger load operation is not dependent on an older store operation with an uncomputed address.

14. The computer system of claim 12, wherein the data speculation verification unit included in the load store unit is configured to verify a dependency prediction predicting that a result of a younger load operation will equal a source of an older store operation.

15. The computer system of claim 11, wherein a functional unit configured to execute non-memory operations includes one of the one or more data speculation verification units, wherein the data speculation verification unit included in the functional unit is configured to verify a data prediction predicting a result of a non-memory operation.

16. The computer system of claim 11, wherein the retire queue is included in a reorder buffer.

17. The computer system of claim 11, wherein one of the one or more data speculation verification units is configured to receive information identifying each one of a plurality of outstanding operations for which a type of data speculation verified by that one of the one or more data speculation verification units has been performed; and
wherein that one of the one or more data speculation verification units is configured to identify which outstanding operations have been verified by that one of the one or more data speculation verification units by advancing a respective speculation pointer to identify an operation younger than the youngest outstanding operation on which data speculation has been verified and not younger than the oldest outstanding operation on which the type of data speculation has been performed.

18. The computer system of claim 11, wherein in response to the retire queue receiving a plurality of speculation pointers, the retire queue is configured to determine whether an operation is retirable by determining whether the operation is not younger than a youngest operation identified as being non-data-speculative by all of the plurality of speculation pointers.

19. The computer system of claim 11, wherein one of the one or more data speculation verification units is configured to set a value of a respective speculation pointer to indicate that no currently outstanding operations are data-speculative with respect to that one of the one or more speculation verification units if no operation currently outstanding within the one of the one or more data speculation verification units is data-speculative.

20. The computer system of claim 11, wherein the microprocessor includes a memory controller configured to control accesses to the memory, wherein one of the one or more data speculation verification units is comprised in the memory controller and configured to verify memory prediction.

21. A method, comprising:
performing data speculation for an operation;
a verification unit verifying the data speculation performed for the operation;
the verification unit generating a speculation pointer indicating that the operation is not data-speculative with respect to the verification unit in response to said verifying; and
in response to receiving the speculation pointer indicating that the operation is not data-speculative with respect to the verification unit, a retire queue selectively retiring the operation, wherein said generating the speculation pointer indicating that the operation is not data-speculative with respect to the verification unit depends on the operation being a youngest operation on which any type of data speculation verified by the verification unit has been performed.

22. The method of claim 21, further comprising an other verification unit verifying data speculation performed on an other operation and generating an other speculation pointer indicating that the other operation is not data-speculative with respect to the other verification unit;
wherein said retiring the operation is dependent on both the speculation pointer and the other speculation pointer.

23. The method of claim 22, wherein the other verification unit verifies a different type of data speculation than the verification unit.

24. The method of claim 21, further comprising retiring an older operation than the operation in response to said generating.

25. The method of claim 21, further comprising providing the verification unit information identifying outstanding operations on which any type of data speculation verified by the verification unit has been performed.

26. The method of claim 25, wherein said generating the speculation pointer depends on the information identifying outstanding operations indicating that the operation is a youngest operation on which any type of data speculation verified by the verification unit has been performed.

27. The method of claim 21, wherein the verification unit is comprised in a load store unit; and wherein said verifying comprises verifying a dependency prediction performed for the operation.

28. The method of claim 27, wherein said verifying comprises verifying that the operation is not dependent on an older store operation with an uncomputed address.

29. The method of claim 27, wherein said verifying comprises verifying that a result of the operation will equal a source of an older store operation.

30. The method of claim 21, wherein the verification unit is comprised in a functional unit configured to execute non-memory operations, wherein said verifying comprises the functional unit verifying a data prediction predicting a result of the operation.

31. The method of claim 21, wherein said retiring comprises a reorder buffer retiring the operation.

32. The method of claim 21, wherein said retiring depends on a plurality of speculation pointers.

33. The method of claim 21, wherein if data speculation verified by the verification unit has not been performed on any other outstanding operation, said generating comprises setting a value of the speculation pointer to indicate that no currently outstanding operations are data speculative with respect to verification unit.

34. The method of claim 21, wherein the verification unit is included in a memory controller; and wherein said verifying comprises verifying a memory prediction performed for the operation.

35. A microprocessor, comprising:

means for performing data speculation on operations;

one or more means for verifying the data speculation performed for at least some of the operations, wherein each of the one or more means for verifying is configured to generate a respective speculation pointer indicating which operations are data-speculative with respect to that means for verifying; and means for retiring operations dependent on the speculation pointers generated by the one or more means for verifying by determining whether the operations are not younger than a youngest operation identified as being non-data-speculative by each of the generated speculation pointers.

* * * * *